UNITED STATES PATENT OFFICE.

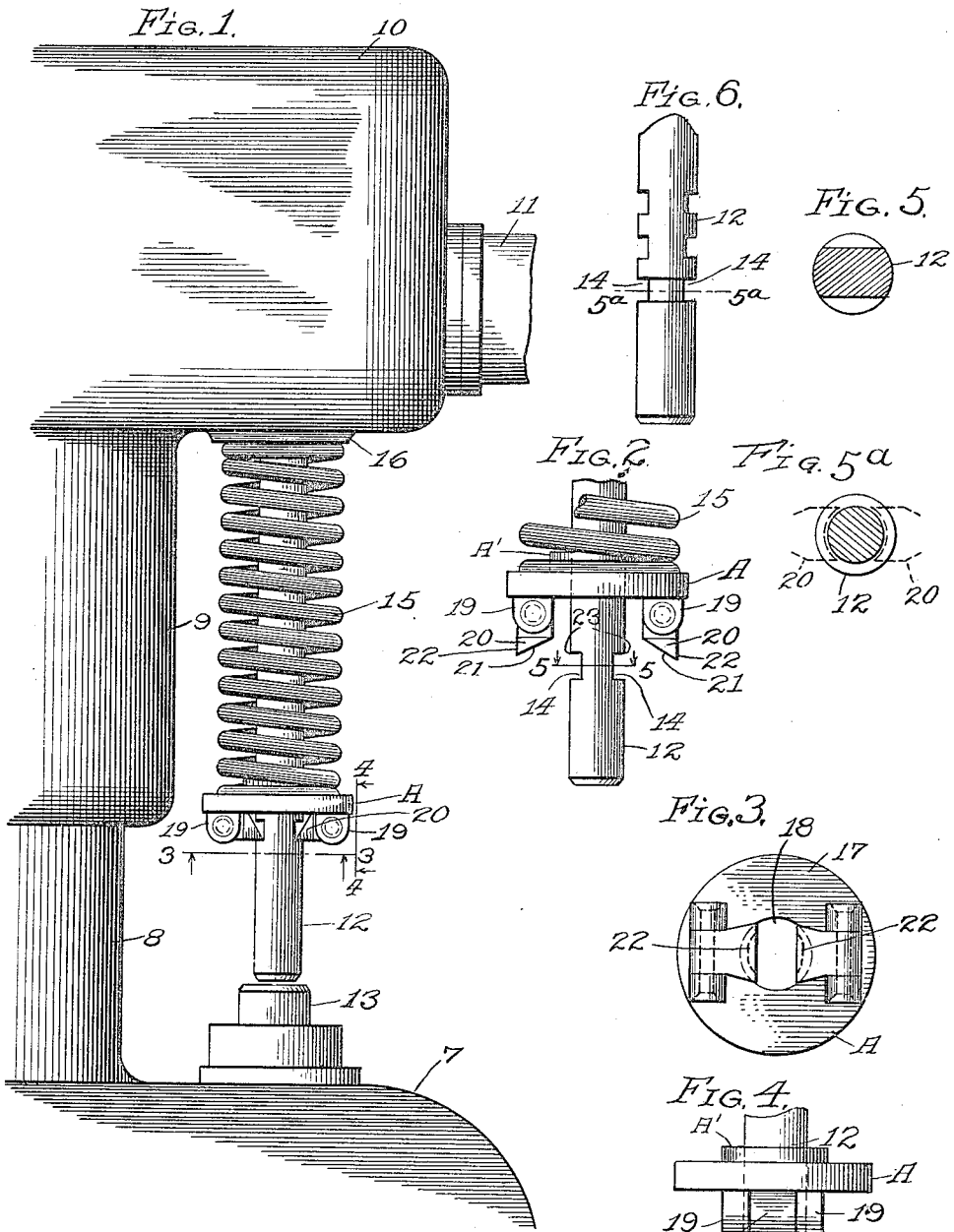

WILLIAM B. HOBAN, OF CHICAGO, ILLINOIS.

VALVE-SPRING RETAINER.

1,213,488.  Specification of Letters Patent.  Patented Jan. 23, 1917.

Application filed October 30, 1912. Serial No. 728,749.

*To all whom it may concern:*

Be it known that I, WILLIAM B. HOBAN, a citizen of the United States, residing at Chicago, in the county of Cook and State of Illinois, have invented new and useful Improvements in Valve-Spring Retainers, of which the following is a full, clear, concise, and exact description, reference being had to the accompanying drawing, forming a part of this specification.

My invention relates to improvements in spring controlled means for valves, and is especially adapted for use in connection with automobile valves and has for its object the production of a device, by means of which the valve stem may be readily removed for regrinding.

A further object is the production of a device, by means of which the tension of the valve stem may be adjusted or relieved at will.

A further object is the production of a device that is of extremely simple construction, of few parts, and not liable to get out of order.

These, and such other objects as may hereinafter appear are attained by my device, an embodiment of which will be illustrated in the acompanying drawing, in which:

Figure 1 represents a portion of an automobile with my improved device in position; Fig. 2 represents an enlarged view of a portion of Fig. 1, showing the parts in changed position; Fig. 3 represents a sectional view on the line 3—3 of Fig. 1, looking in the direction indicated by the arrows; Fig. 4 represents a side elevation of that portion of Fig. 1 shown in Fig. 3, with modification; Fig. 5 represents a sectional view on the line 5—5 of Fig. 2, looking in the direction indicated by the arrows; Fig. 5ª represents a sectional view on the line 5—5 of Fig. 6, looking in the direction of the arrows; and Fig. 6 represents a modified form of valve stem.

Like numerals of reference indicate like parts in the several figures of the drawing.

Referring now to the drawing, 7 represents a portion of the base, 8 a portion of the cylinder, 9 a portion of the water jacket and 10 a portion of the valve chamber, 11 the exhaust and 12 the valve stem, mounted just above the cam stem 13. The valve stem is provided with a pair of notches 14 on opposite sides as shown in Figs. 1 and 2. These notches may be two in number on opposite sides, as shown in these figures, or may comprise a longitudinal extending series of notches 14, as shown in Fig. 6, either disposed on opposite sides of the valve stem 12 or the means for engagement may be in the form of a circumferential groove, extending entirely around the same as shown in Fig. 5ª. The spring 15 surrounds the valve stem, the upper end of which rests against the valve chest at 16 and the lower end being held in position on the valve stem by means of a follower A. This follower comprises preferably a disk member 17 provided with a circular opening 18, through which the valve stem passes, and having on its lower surface a pair of ears 19, within each pair of which is pivotally mounted a dog or latch 20. This dog is preferably provided with a diagonal face 21 permitting the ends of the dogs to be manually brought into engagement with the notches in the valve stem as shown in Fig. 1. In the event that peripheral notches are used, the faces of the dogs will be curved to correspond to the circumference of the stem as shown at 22.

Referring to the operation of my device, the notch 14 is placed in the required position in order to give the requisite pressure to the spring 15 and the follower pressed up against the base of the spring and the dogs manually brought into engagement with the notches as shown in Fig. 1. In the event that variations in the pressure of the spring is required, the form shown in Fig. 6 is used in which case the follower is slid up until the requisite pressure is reached, and then the dogs brought into engagement with the stem. When it is desired to grind the valves, it is only necessary to slip the fingers on either side of the valve stem and raise the follower, thus permitting the dogs to drop by gravity to the position indicated in Fig. 2, relieving the tension of the spring. The nut or cap not shown in the cylinder immediately above the valve stem is then unscrewed and the valve stem removed when it can be reground and again inserted in place.

In Fig. 4 I have shown a modified form of my device in which the follower A is provided with an upwardly extending boss A' of circular form and concentric with the follower itself, and adapted to fit tightly within the spring, thereby holding the spring from any side movement.

This device makes it an extremely simple operation as no mechanism is required to lift the valve, and neither is it necessary to remove the spring, it being possible in the manner hereinbefore described to perform that operation expeditiously and quickly.

The sloping face 21 insures the releasing of the dog even though it does not readily fall by gravity, as the face in raising would automatically strike against the edge 23 and force the dog out of engagement.

I claim:

1. In a device of the class described, the combination of a valve stem having a longitudinally extending series of notches, a spring surrounding said stem, a follower mounted thereon below said spring, and engaging means mounted on said follower and adapted to engage the notches in said valve stem and hold the spring under tension.

2. In a device of the class described, the combination of a notched valve stem, a spring surrounding said stem, a follower mounted thereon below said spring, a pair of curved dogs mounted on the under side of said follower and adapted to be manually brought into engagement with the notches of said valve stem and to automatically drop out of engagement when said follower is raised.

3. In a device of the class described, the combination with a notched valve stem, a spring surrounding said stem, a follower mounted below said spring and provided with a circular boss adapted to fit within said spring and hold it in position, a pair of curved dogs mounted on the under side of said follower and adapted to be manually brought into engagement with the notches of said valve stem and to automatically drop out of engagement when said follower is raised.

4. In a device of the class described, the combination of a valve stem having a longitudinally extending series of means for engagement thereon, a spring surrounding said stem, a follower mounted thereon engaging said spring, and engaging means mounted on said follower for engaging said means for engagement on the stem to hold the spring under any desired degree of tension.

5. In a device of the class described, the combination of a valve stem having a longitudinally extending series of means for engagement thereon, a spring surrounding said stem, a follower mounted thereon engaging said spring, and engaging means mounted on said follower for engaging said means for engagement on the stem to hold the spring under tension, said engaging means being so mounted as to automatically drop out of engagement with said means on the valve stem when the follower is raised.

In witnesses whereof, I have hereunto subscribed my name in the presence of two witnesses.

WILLIAM B. HOBAN.

Witnesses:
  M. REYNOLDS,
  F. H. DRURY.

Copies of this patent may be obtained for five cents each, by addressing the "Commissioner of Patents, Washington, D. C."